US010245957B2

United States Patent
Herb

(10) Patent No.: US 10,245,957 B2
(45) Date of Patent: Apr. 2, 2019

(54) SMART REGENERATIVE BRAKING CONTROL

(71) Applicant: NIO USA, Inc., San Jose, CA (US)

(72) Inventor: Robert Herb, Morgan Hill, CA (US)

(73) Assignee: NIO USA, Inc., San Jose, CA (US)

( * ) Notice: Subject to any disclaimer, the term of this patent is extended or adjusted under 35 U.S.C. 154(b) by 79 days.

(21) Appl. No.: 15/339,268

(22) Filed: Oct. 31, 2016

(65) Prior Publication Data

US 2018/0079312 A1    Mar. 22, 2018

Related U.S. Application Data

(60) Provisional application No. 62/395,417, filed on Sep. 16, 2016.

(51) Int. Cl.

| B60L 7/18 | (2006.01) |
|---|---|
| B60T 8/58 | (2006.01) |
| B60T 8/24 | (2006.01) |
| B60T 1/10 | (2006.01) |
| B60T 8/1755 | (2006.01) |
| B60L 7/26 | (2006.01) |
| B60L 15/20 | (2006.01) |

(52) U.S. Cl.
CPC ............... *B60L 7/18* (2013.01); *B60L 7/26* (2013.01); *B60L 15/2027* (2013.01); *B60T 1/10* (2013.01); *B60T 8/1755* (2013.01); *B60T 8/245* (2013.01); *B60T 8/58* (2013.01); *B60L 2240/62* (2013.01); *B60L 2240/64* (2013.01); *B60L 2240/68* (2013.01); *B60T 2201/02* (2013.01); *B60T 2201/04* (2013.01); *B60T 2270/60* (2013.01)

(58) Field of Classification Search
CPC .......... B60L 7/18; B60L 7/26; B60L 15/2027; B60L 2240/64; B60L 2240/68; B60L 2240/62; B60T 8/58; B60T 8/245; B60T 2270/60; B60T 1/10; B60T 8/1755; B60T 2201/04; B60T 2201/02
USPC .......................................................... 701/98
See application file for complete search history.

(56) References Cited

U.S. PATENT DOCUMENTS

2006/0028065 A1 *   2/2006   Thiede ............... B60K 31/0008
                                                        303/193
2017/0247023 A1 *   8/2017   Owen ..................... B60T 8/241

* cited by examiner

Primary Examiner — Brian P Sweeney
(74) Attorney, Agent, or Firm — Sheridan Ross P.C.

(57) ABSTRACT

A smart braking system for a vehicle is provided. The smart braking system selectively activates a braking system of the vehicle when the smart braking system detects a scenario in which it is likely that a constant vehicle speed, rather than an increasing vehicle speed, would be desired by a driver. In one example, a driver releases an accelerator while the vehicle is on a decline but the vehicle accelerates anyway. In this instance, the smart braking system records the speed of the vehicle when the accelerator is released and applies the braking system to maintain the speed of the vehicle at the recorded speed while the vehicle is on the decline. The smart braking system stops activating the braking system upon detecting that braking is no longer needed to slow down the vehicle.

20 Claims, 4 Drawing Sheets

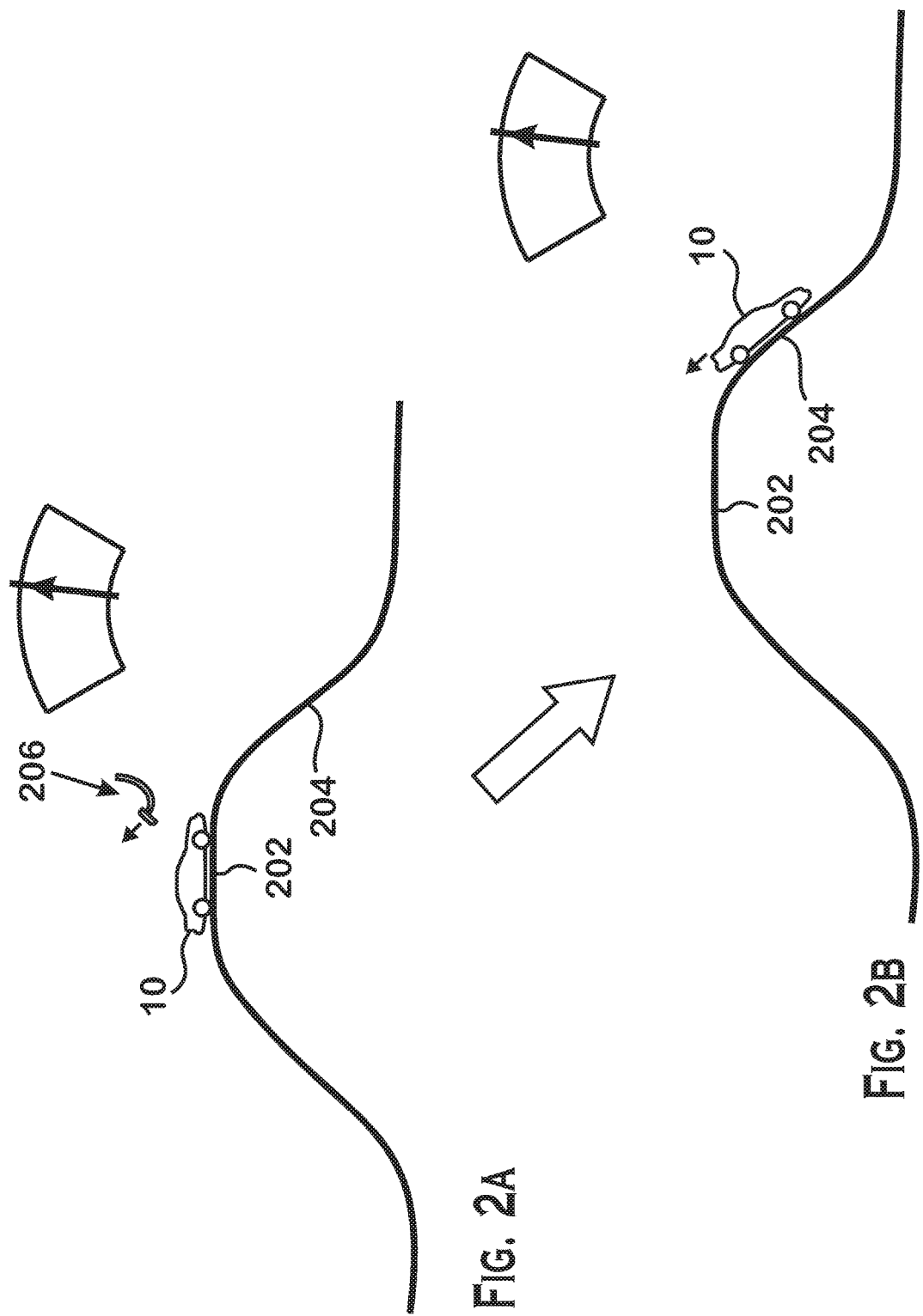

SMART REGENERATIVE BRAKING CONTROL

CROSS REFERENCE TO RELATED APPLICATIONS

This application claims the benefit of U.S. Provisional Patent Application No. 62/395,417, filed Sep. 16, 2016, which is incorporated by reference as if fully set forth herein.

FIELD OF INVENTION

The present disclosure relates to efficient use of energy for electric vehicles, and, more particularly, to a smart regenerative braking for an electric vehicle.

BACKGROUND

A modern vehicle is capable of sensing its environment. Numerous companies have improved algorithms to increase efficiency, comfort, and safety of driving. Further improvements in the field of vehicle control are desirable.

SUMMARY

The present disclosure is related to smart braking systems for vehicles. The smart braking system may be a vehicle control system or may be included within a vehicle control system configured to perform one or more vehicle control operations. In some aspects, the control system is configured to perform a smart braking control method. The smart braking control method includes detecting a triggering condition, recording a current speed of the vehicle, and activating a braking system of the vehicle to maintain the speed of the vehicle at the current speed. The smart braking control method may be performed when cruise control is not activated for the vehicle.

BRIEF DESCRIPTION OF THE DRAWINGS

The foregoing Summary and the following detailed description will be better understood when read in conjunction with the appended drawings, which illustrate a preferred embodiment of the invention. In the drawings:

FIGS. 2A-2C illustrate examples of a smart braking technique.

DETAILED DESCRIPTION OF THE DRAWINGS

Figure 1:
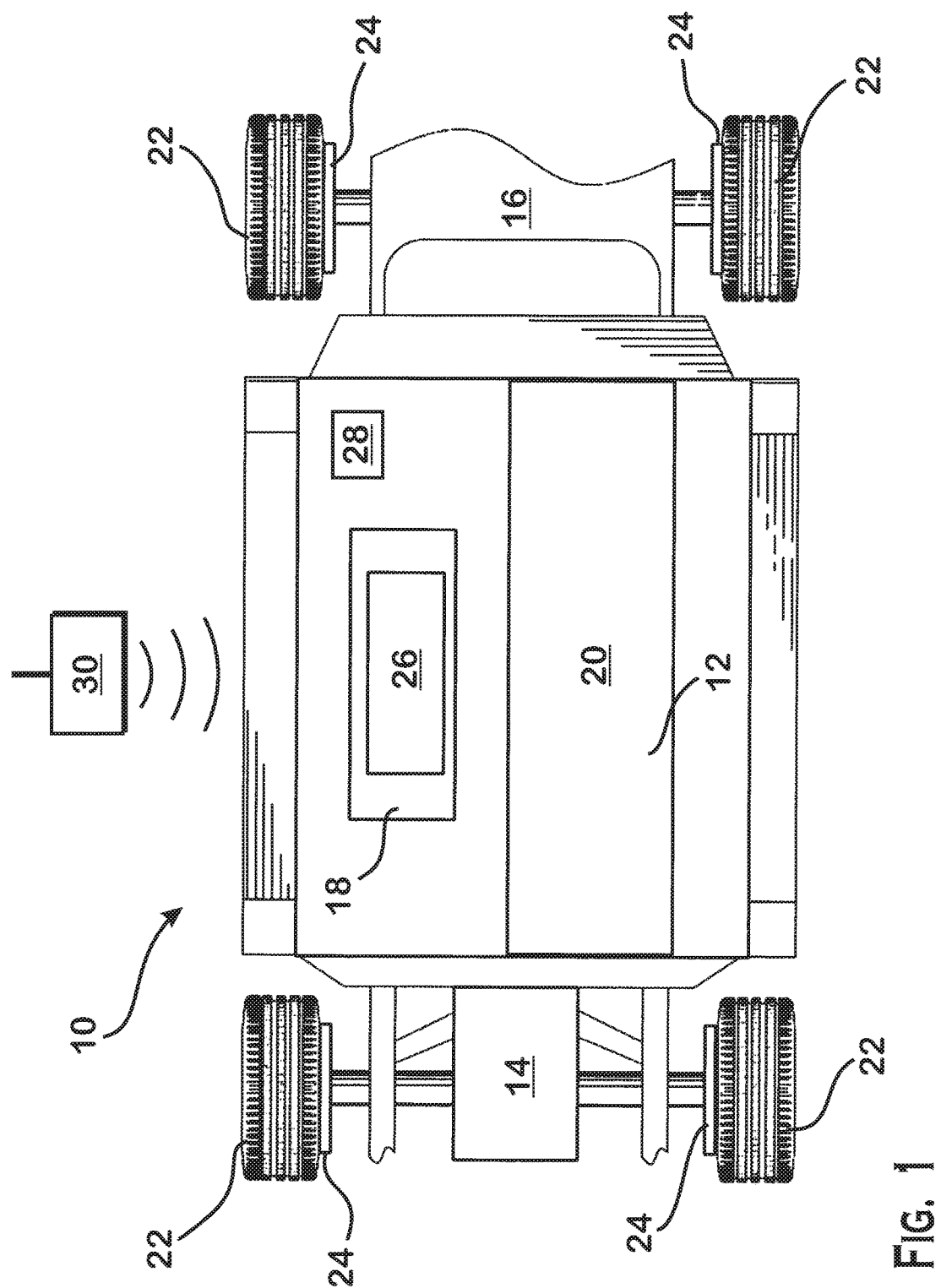
FIG. 1 is a schematic drawing of a vehicle, according to an embodiment.

FIG. 1 is a schematic drawing of a vehicle 10, according to an embodiment. The vehicle 10 includes an energy storage system 12, a motor 14 (and can include more than just one motor), a braking system 16, and a control system 18. The energy storage system 12 includes a battery 20 that stores electrical energy. The motor 14 is operatively connected to the battery 20 and is configured to produce mechanical energy to move the vehicle 10 (e.g., via wheels 22). The braking system 16 is configured to slow the vehicle 10 via one or more brakes 24. Brakes 24 include one or more friction braking mechanisms and one or more regenerative braking mechanisms that restore energy to the energy storage system 12 by reducing speed of the vehicle 10.

The control system 18 is operatively connected to the energy storage system 12, the motor 14, and the braking system 16. The control system 18 may include a controller 26 that includes, for example, a processor, memory, I/O device(s), database, etc., and the like. The control system 18 may be or may be included in a vehicle on-board computer. The control system 18 is configured to control motor power, other internal systems (e.g., passenger comfort systems, external signaling systems, and the like), and to autonomously pilot the vehicle 10. Autonomous piloting includes controlling speed and steering based on autonomous operation algorithms and on inputs received with input devices 28 (such as sensors or communication equipment like cameras, radar sensors, microphones, wireless communication equipment, accelerometers, geo-positioning devices that determine a global position of the vehicle from satellite signals, and other input sensors) that are considered to be a part of the control system 18. The control system 18 may control the vehicle based on a position of the vehicle as determined by a geo-positioning system within input devices 28.

The input devices 28 obtain a wide variety of information about the vehicle 10 and the surroundings of the vehicle 10. For instance, the input devices 28 include sensors such as a speedometer, motor power sensors for sensing motor power, sensors for determining battery charge and power usage, and the like. The input devices 28 also include communication devices for obtaining information about road or environmental conditions. The communication devices communicate wirelessly with an external computer system 30 to obtain road information (e.g., the shape of the road, including incline or decline), traffic information (e.g., traffic density and/or locations of vehicles, weather information, and the like. The communication devices may also obtain, from external computer system 30, road parameters that define the layout of the road, including position and dimensions of the road as well as grade (incline/decline) of the road. Some road parameters may be pre-stored in a storage device accessible to the control system 18 and within the vehicle 10. The external computer system 30 may be implemented as a typical computer system and include components such as a hardware processor and a hardware memory for storing instructions to be executed by the processor. The instructions would be configured to perform the functionality described herein.

Cruise control is a technique in which speed of the vehicle is maintained at or near a selected speed (also called a "target speed"). To perform cruise control, the control system 18 performs one or more steps that control a speed of the vehicle 10. For example, the control system 18 may selectively control the motor 14 to provide power to the vehicle 10 in order to accelerate to the target speed or to maintain the speed of the vehicle 10 at the target speed. In some embodiments, the control system 18 may also selectively slow the vehicle 10 (e.g., via the brakes 24 or by applying zero or negative torque (e.g., with regenerative braking) to an output shaft) to maintain the selected speed (e.g., when the vehicle travels downhill).

A driver controls cruise control by setting a particular speed to maintain. The vehicle 10 then applies forwards or reverse torque to maintain that speed. The driver may use one or more cruise control input devices (included within input devices 28) to enable and control the cruise control system. In one scheme, a first switch enables cruise control. Additional switches allow the target speed of cruise control to be set to the current speed of the vehicle 10 or allow the target speed to be increased or decreased. If no target speed exists, then even through cruise control may be enabled, the vehicle 10 does not control the vehicle 10 to match the target speed of the cruise control system. No target speed exists either when the cruise control is first enabled and no target speed has yet been set or when the driver activates the braking system (i.e., braking causes the cruise control system to stop controlling the vehicle 10 to maintain the target speed).

Cruise control is useful in certain scenarios but has limited use in certain situations. For example, cruise control typically cannot be enabled when the speed of a vehicle is less than a certain threshold (e.g., 25 miles per hour).

Therefore, a new technique for controlling speed of the vehicle 10 is provided herein. In the discussion of this technique provided below, wherever the vehicle 10 is described as performing certain control functions, it should be understood that appropriate control units within the vehicle 10, such as the control system 18, would perform the control functions. This new technique, referred to as "smart braking," helps compensate for a situation in which a driver might expect the vehicle to maintain a particular speed, based on the inputs of the driver to the vehicle 10, but the vehicle 10 accelerates instead. Such a situation typically occurs when the vehicle is on a decline. The force of gravity causes the vehicle 10 to accelerate to a greater degree than if the vehicle 10 were on less of a decline or were on no decline. Often in such situations, the vehicle 10 speeds up in such a way that the driver may be surprised by the speed of the vehicle 10 upon subsequently checking that speed.

Thus, smart braking selectively activates the braking system to decelerate the vehicle 10 to maintain the speed of the vehicle 10 at or near a "current speed" upon detecting a triggering condition. The triggering condition includes one or more of the following: detecting that the driver is not activating an accelerator (which may be included in input devices 28 and which comprises a device, such as a pedal, that allows the driver to cause the vehicle 10 to accelerate) to apply acceleration but that the vehicle 10 is accelerating anyway; detecting that the vehicle 10 is on a decline (via an accelerometer that detects that the vehicle is not level); or detecting that the vehicle 10 is experiencing more acceleration than "normal," given the degree to which the accelerator is being activated. "Normal" acceleration may be determined by recording the history of the acceleration of the vehicle 10 correlated with the level to which the accelerator is activated and comparing the current level of acceleration and accelerator activation level to this history. The history may be recorded over a time period (e.g., the previous hour), over the entire current ride (e.g., since the vehicle 10 was powered on), or over the lifetime of the vehicle 10. The current speed is the speed of the vehicle 10 when the vehicle 10 detected the triggering condition. Upon detecting the triggering condition, the vehicle 10 selectively activates the braking system to maintain the speed of the vehicle 10 at the current speed. In some embodiments, the vehicle 10 activates the braking system when the accelerator is not activated, but not when the accelerator is activated, even if the triggering condition occurs when the accelerator is activated. In other words, in some embodiments, if the triggering condition occurs while the accelerator is activated, then the vehicle 10 will record the current speed but waits until the accelerator is no longer activated to activate the braking system. In other embodiments, the only triggering condition is when the accelerator is deactivated. In such embodiments, the vehicle 10 detects that the accelerator is deactivated and the vehicle is accelerating anyway, and activates the braking system to maintain the vehicle at the speed that the vehicle 10 was at when the accelerator was deactivated.

Note that the smart braking technique does not involve automatically applying the accelerator. Only the brake is applied to maintain a particular speed. This is in contrast with cruise control, which applies both the brake and the accelerator.

The vehicle 10 may apply the smart braking technique during a smart braking mode and may refrain from applying the smart braking technique when the vehicle 10 is not in the smart braking mode. The smart braking mode may be always set such that the vehicle 10 always applies the smart braking technique. Alternatively, the driver may switch the smart braking mode on or off via a control included in the input devices 28 such that the driver can control when the vehicle 10 applies the smart braking technique. In some embodiments, the smart braking mode is not activated when cruise control is activated. In some embodiments, cruise control is not activated when the smart braking technique is activated.

Some examples of operation of the smart braking system are now provided. In one example, the smart braking mode is on. The driver drives the vehicle 10 on flat ground towards a decline in the road. Upon reaching the decline, the driver disengages the accelerator. The vehicle 10 detects that despite the accelerator being disengaged, the vehicle 10 is still accelerating. In response to detecting that the vehicle is accelerating while the accelerator is not activated, the vehicle activates the braking system to maintain the vehicle 10 at a current speed. The current speed may be the speed of the vehicle when the driver disengaged the accelerator or when the vehicle 10 detected that the vehicle 10 was still accelerating despite the accelerator being disengaged.

In another example, the vehicle 10 is approaching a decline in the road. When the vehicle 10 arrives at the decline, the vehicle 10 detects that the vehicle 10 is accelerating to a greater degree than "normal," where "normal" acceleration is determined based on the history of acceleration versus accelerator activation level for the vehicle 10. This detection occurs despite the driver activating the accelerator to some degree greater than zero activation. In an example, the vehicle 10 may determine that the vehicle 10 is accelerating to a greater degree than normal by examining the average historical acceleration of the vehicle 10 for the current degree to which the accelerator is being activated and determining that the current acceleration of the vehicle 10 is above a threshold percentage (e.g., 110%, 125%) of that average. In response to detecting that the vehicle 10 is accelerating to a greater degree than normal, the vehicle 10 records the current speed of the vehicle and activates the braking system to maintain the vehicle 10 at that current speed.

In some examples, the vehicle 10 resets the current speed, such that no current speed is set for the smart braking application, upon detecting a reset condition. The reset condition may include one or more of the vehicle 10 detecting that the vehicle 10 is decelerating without the braking system activated or that the vehicle 10 is accelerating under a threshold amount below an average amount of acceleration for the level of accelerator activation. Resetting the current speed allows a new speed to be recorded as the current speed when the vehicle 10 again detects a triggering condition.

Figure 2C:
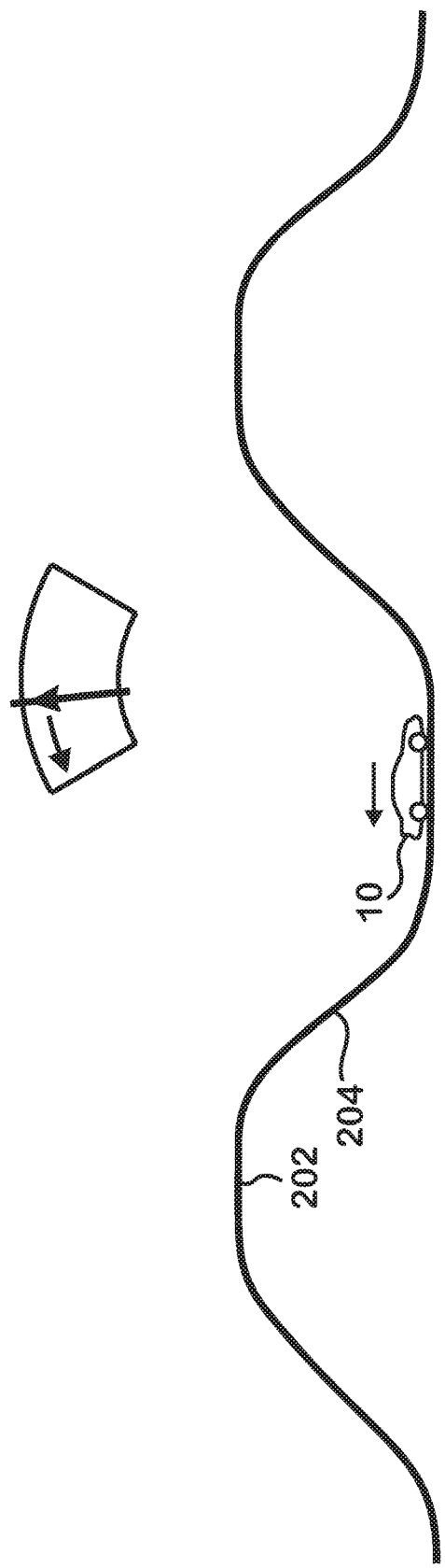

FIGS. 2A-2C illustrate examples of the smart braking technique. In FIG. 2A, a vehicle 10 is driving on a flat section 202 of road. At some point, the driver releases the accelerator 206 and then the vehicle 10 arrives at a decline 204. The vehicle 10 detects a triggering condition, records a current speed, and, in FIG. 2B, activates the braking system to maintain the vehicle 10 at the current speed. In FIG. 2C, the vehicle 10 detects a reset condition and resets the current speed so that the current speed can be set to something different upon again detecting a triggering condition.

The smart braking technique is used when cruise control is off. More specifically, if cruise control is set, the vehicle 10 maintains a particular speed regardless of whether the triggering conditions above are detected. Additionally, the smart braking technique may cease to be applied when braking is no longer needed. For example, the vehicle 10 may detect that the vehicle 10 is decelerating despite no braking being applied. In that scenario, the vehicle 10 would stop applying the smart braking technique.

Figure 3:
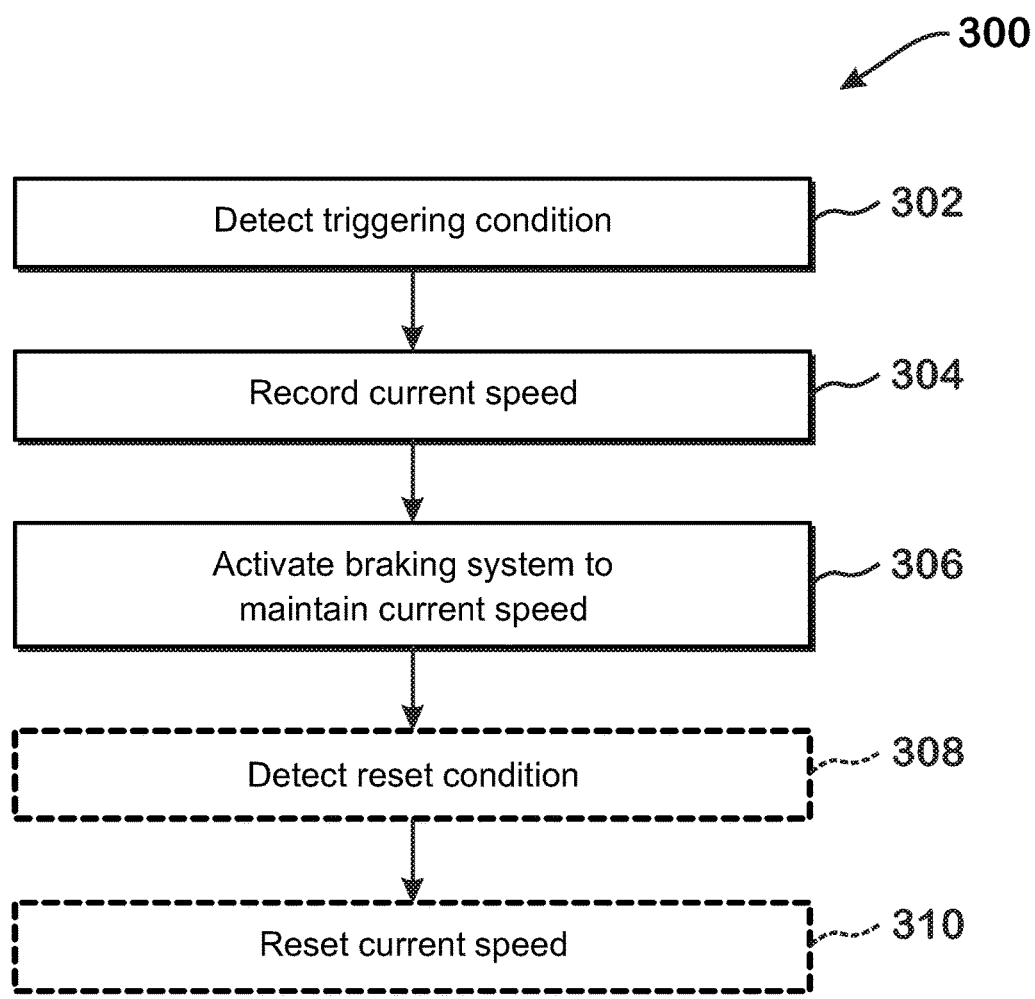
FIG. 3 is a flow diagram of a method for operating a vehicle in smart braking mode, according to an example.

FIG. 3 is a flow diagram of a method 300 for operating a vehicle 10 in smart braking mode, according to an example. Although described with respect to the system shown and described with respect to FIGS. 1 and 2A-2C, it should be understood that any system configured to perform the method, in any technically feasible order, falls within the scope of the present disclosure.

As shown, the method 300 begins at step 302, where the vehicle 10 detects a triggering condition. The triggering condition includes at least one of detecting that the driver is not activating the accelerator but that the vehicle 10 is accelerating anyway, detecting that the vehicle 10 is on a decline, or detecting that the vehicle is experiencing more acceleration than normal, given the degree to which the accelerator is being activated.

At step 304, the vehicle 10 records the current speed. This current speed is the speed of the vehicle 10 at the time of recording. The purpose of recording this speed is so that the vehicle 10 can apply brakes to maintain the speed. Note that this smart braking technique does not involve automatically applying the accelerator. Only the brake is applied to maintain a particular speed.

At step 306, the vehicle 10 activates the braking system to maintain the recorded speed. The braking system applies a friction brake and/or a regenerative brake to cause the vehicle to maintain speed at or near the recorded speed.

Steps 308 and 310 are optional. At step 308, the vehicle 10 detects a reset condition. The reset condition includes one of the vehicle 10 detecting that the vehicle is decelerating without the braking system activated or that the vehicle is accelerating under a threshold amount below a "normal" amount of accelerating. In response to such detection, at step 310, the vehicle 10 resets the current speed and stops applying the braking technique. The vehicle 10 may again apply the braking technique responsive to detecting another triggering condition.

The disclosed embodiments provide techniques for controlling a braking system of a vehicle to prevent undesirable acceleration that may occur, for example, when the vehicle is on a decline. Often, drivers may activate an accelerator to approximately the same degree regardless of slope of the road. Alternatively, drivers may realize that there is a decline in the road and may release the accelerator, but the vehicle may accelerate anyway due to the decline. Thus, when a vehicle is driving over a declining road, the vehicle may accelerate to a greater speed than desired by the driver. The techniques provided herein activate the braking system to reduce the acceleration of the vehicle to prevent such unwanted acceleration.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A method for controlling, via a smart braking system, a speed of a vehicle while a cruise control system of the vehicle is deactivated, comprising:
   determining, at a first time, that an accelerator of the vehicle is deactivated;
   recording a travel speed of the vehicle at the first time;
   determining, at a second time, that the vehicle is accelerating while the accelerator is deactivated; and
   responsive to determining that the vehicle is accelerating while the accelerator is deactivated, activating a braking system of the vehicle to maintain the speed of the vehicle at the recorded travel speed of the vehicle at the first time.

2. The method of claim 1, wherein determining that the vehicle is accelerating comprises one of detecting that the vehicle is on a decline or detecting that the vehicle is experiencing more acceleration than a predetermined threshold amount.

3. The method of claim 1, wherein recording the travel speed of the vehicle occurs responsive to determining that the vehicle is accelerating while the accelerator is deactivated.

4. The method of claim 1, comprising:
   determining that the vehicle is decelerating while the braking system is deactivated; and
   responsive to determining that the vehicle is decelerating while the braking system is deactivated, recording a subsequent travel speed.

5. The method of claim 1, further comprising:
   detecting activation of a switch that toggles the smart braking system off.

6. The method of claim 1, wherein the method for controlling the speed of the vehicle while the cruise control system of the vehicle is deactivated is performed while the vehicle is in an autonomous mode, and wherein the autonomous mode is a vehicle state where the vehicle navigates through any terrain without human input.

7. The method of claim 1, further comprising:
   receiving condition information from an external device, wherein the condition information is used to inform the vehicle about at least one of road conditions or environmental conditions.

8. The method of claim 7, wherein the condition information received from the external device is pre-stored in a memory of the vehicle or in a memory of an external device.

9. The method of claim 7, wherein the method for controlling the speed of the vehicle while the cruise control system of the vehicle is deactivated is based on the condition information received, and wherein the condition information comprises a position of roads, a dimension of roads, and/or a grade defining a slope of roads.

10. A vehicle controller for controlling, via a smart braking system, a speed of a vehicle while a cruise control system of the vehicle is deactivated, comprising:

a memory storing instructions; and a processor that, upon executing the instructions, performs operations comprising:

determining, at a first time, that an accelerator of the vehicle is deactivated;

recording a travel speed of the vehicle at the first time;

determining, at a second time, that the vehicle is accelerating while the accelerator is deactivated; and responsive to determining that the vehicle is accelerating, activating a braking system of the vehicle to maintain the speed of the vehicle at the recorded travel speed of the vehicle at the first time.

11. The vehicle controller of claim 10, wherein determining that the vehicle is accelerating comprises one of detecting that the vehicle is on a decline or detecting that the vehicle is experiencing more acceleration than a predetermined threshold amount.

12. The vehicle controller of claim 10, wherein recording the travel speed of the vehicle occurs responsive to determining that the vehicle is accelerating while the accelerator is deactivated.

13. The vehicle controller of claim 10, wherein the operations further comprise:

determining that the vehicle is decelerating while the braking system is deactivated; and responsive to determining that the vehicle is decelerating while the braking system is deactivated, recording a subsequent travel speed.

14. The vehicle controller of claim 10, wherein the operations further comprise:

detecting activation of a switch that toggles the smart braking system off.

15. The vehicle controller of claim 10, wherein the operations further comprise: the method for controlling the speed of the vehicle while the cruise control system of the vehicle is deactivated is performed while the vehicle is in an autonomous mode, wherein the autonomous mode is a vehicle state where the vehicle navigates through any terrain without human input.

16. The vehicle controller of claim 10, wherein the operations further comprise:

receiving condition information from an external device, wherein the condition information is used to inform the vehicle about at least one of road conditions or environmental conditions.

17. The vehicle controller of claim 16, wherein the operations further comprise that the condition information received from the external device is pre-stored in a memory of the vehicle or in a memory of an external device.

18. The vehicle controller of claim 16, wherein controlling the speed of the vehicle while the cruise control system of the vehicle is deactivated is based on the condition information received, and wherein the condition information comprises a position of roads, a dimension of roads, and/or a grade defining a slope of roads.

19. A vehicle, comprising:

a braking system; and a vehicle controller for controlling, via the braking system, a speed of the vehicle while a cruise control system of the vehicle is deactivated, the vehicle controller comprising:

a memory storing instructions; and a processor that, upon executing the instructions, performs operations comprising:

determining, at a first time, that an accelerator of the vehicle is deactivated;

recording a travel speed of the vehicle at the first time;

determining, at a second time, that the vehicle is accelerating while the accelerator is deactivated; and responsive to determining that the vehicle is accelerating, activating the braking system to maintain the speed of the vehicle at the current recorded travel speed of the vehicle at the first time.

20. The vehicle of claim 19, wherein the operations further comprise:

determining that the vehicle is decelerating while the braking system is deactivated; and responsive to determining the vehicle is deaccelerating while the braking system is deactivated, recording a subsequent travel speed.

* * * * *